United States Patent
Shaw et al.

(10) Patent No.: US 6,767,488 B2
(45) Date of Patent: Jul. 27, 2004

(54) FIBER IMBEDDED POLYMERIC SPONGE PRODUCTION METHOD

(75) Inventors: James Stephen Shaw, Hampton Falls, NH (US); Laurence E. Stone, Springville, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/379,943

(22) Filed: Mar. 5, 2003

(65) Prior Publication Data

US 2003/0162855 A1 Aug. 28, 2003

Related U.S. Application Data

(62) Division of application No. 09/944,709, filed on Aug. 31, 2001.

(51) Int. Cl.[7] .................................................. C08J 9/00
(52) U.S. Cl. ...................... 264/45.3; 264/138; 264/140; 521/99; 521/102; 521/109.1; 521/155
(58) Field of Search .............................. 264/45.3, 138, 264/140; 521/99, 102, 109.1, 155

(56) References Cited

U.S. PATENT DOCUMENTS

| | | | |
|---|---|---|---|
| 4,110,164 A | * | 8/1978 | Sutthoff et al. ............. 435/179 |
| 4,512,859 A | | 4/1985 | Inoue |
| 5,146,716 A | | 9/1992 | Lynn |
| 5,207,034 A | | 5/1993 | Lynn |
| 5,219,462 A | | 6/1993 | Bruxvoort et al. |
| 5,234,470 A | | 8/1993 | Lynn et al. |
| 5,256,703 A | | 10/1993 | Hermann et al. |
| 5,325,638 A | | 7/1994 | Lynn |
| 5,344,472 A | | 9/1994 | Lynn et al. |
| 5,674,568 A | * | 10/1997 | Layton et al. ........... 427/389.9 |
| 5,690,996 A | * | 11/1997 | Sanderson et al. .......... 427/244 |
| 5,981,612 A | | 11/1999 | Keppeler et al. |
| 6,183,347 B1 | | 2/2001 | Shaw |
| 6,273,788 B1 | | 8/2001 | Shaw |
| 6,495,652 B1 | | 12/2002 | Reichelt et al. |

OTHER PUBLICATIONS

Sponge–Jet, Inc., "Sponge Blasting System," brochure, 1997.
Sponge–Jet, Inc., "Material Safety Data Sheets," Aug. 30, 1996.
Sponge–Jet, Inc., "Case Histories," publicly available before Aug. 31, 2000.

* cited by examiner

*Primary Examiner*—John M. Cooney, Jr.
(74) *Attorney, Agent, or Firm*—V. G. Ramaswamy; Francis L. Gonte

(57) ABSTRACT

A polymeric sponge includes cellulose fibers imbedded therein. The sponge is made by mixing water and cellulose fibers with a water-catalyzing prepolymer for chemical reaction thereof. The mixture is cured and granulated to size. The cellulose fibers enhance both the manufacturing process and the resulting sponge for increasing strength, durability, and performance thereof.

21 Claims, 2 Drawing Sheets

FIBER IMBEDDED POLYMERIC SPONGE PRODUCTION METHOD

This application is a division of U.S. application Ser. No. 09/944,709; filed Aug. 31, 2001, pending.

BACKGROUND OF THE INVENTION

The present invention relates generally to manufacture and repair of machine parts, and, more specifically, to surface finishing of such parts.

Machines are assemblies of various parts which are individually manufactured and assembled. Machines typically include metal parts, although synthetic and composite parts may also be used. And, each part requires specialized manufacturing.

For example, metal parts may be fabricated from metal stock in the form of sheets, plates, bars, and rods. Metal parts may also be formed by casting or forging. Such parts may be machined to shape in various manners.

Machining requires the selective removal of material to configure the part to its final shape and size within suitable manufacturing tolerances, typically expressed in mils, and with a suitable surface finish which is typically smooth or polished without blemish.

Each step in the manufacturing process of a given machine adds time and expense which should be minimized for producing a competitively priced product. It is desirable for each subsequent step in the manufacturing process to avoid damaging previously finished portions of the part which would then require additional corrective finishing steps.

Gas turbine engines are an example of a complex machine having many parts requiring precise manufacturing tolerances and fine surface finishes. A typical engine includes a multistage compressor for pressurizing air which is mixed with fuel in a combustor and ignited for generating hot combustion gases which flow downstream through one or more turbine stages that extract energy therefrom. A high pressure turbine powers the compressor, and a low pressure turbine provides output power, such as powering a fan disposed upstream from the compressor in an aircraft engine application.

The engine thusly includes various stationary components, and various rotating components which are typically formed of high strength, state of the art metal and composite materials. The various parts undergo several steps in their manufacturing and are relatively expensive to produce.

The various manufacturing processes result in various surface features which require additional processing for final acceptability. For example, sharp burrs must be removed; sharp corners must be radiused; and welding expulsion must be removed.

Hand grinding, grit blasting, and abrasive tumbling are just examples of typical post-processes used to finish the machined surfaces without damage thereto. However, these post-processes each require special equipment and add to the manufacturing time and cost.

A new process entitled Sustained Surface Scrubbing is being developed for quickly and efficiently removing burrs and expulsion and radiusing sharp corners at reduced cost. This basic process is described in U.S. Pat. No. 6,273,788, and is followed by several related patent applications including one recently issued as U.S. Pat. No. 6,183,347.

The various forms of Sustained Surface Scrubbing disclosed in these applications and patents include a pliant shot discharged in a carrier air stream at a shallow angle of incidence against a workpiece for the selective removal of material therefrom. The pliant shot is preferably a polyurethane cellular foam or sponge in small granular form and is preferably impregnated with different types of abrasive material as required for correspondingly different abrasive performance.

One form of the pliant shot is commercially available from Sponge-Jet Inc. of Eliot, Me. under the trademark of SPONGE-JET Media. This sponge media is formed with open cells for trapping contaminants during the intended blasting operations.

However, open-cell trapping of contaminants is undesirable in many applications wherein the pliant shot is intended to be reused for reducing costs. The open cell sponge media has limited strength and durability and affects the performance of the abrasive imbedded therein.

Accordingly, it is desired to provide an improved pliant shot for use in the several forms of Sustained Surface Scrubbing for increasing the strength and durability of the shot, and corresponding performance thereof.

BRIEF DESCRIPTION OF THE INVENTION

A polymeric sponge includes cellulose fibers imbedded therein. The sponge is made by mixing water and cellulose fibers with a water-catalyzing prepolymer for chemical reaction thereof. The mixture is cured and granulated to size. The cellulose fibers enhance both the manufacturing process and the resulting sponge for increasing strength, durability, and performance thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
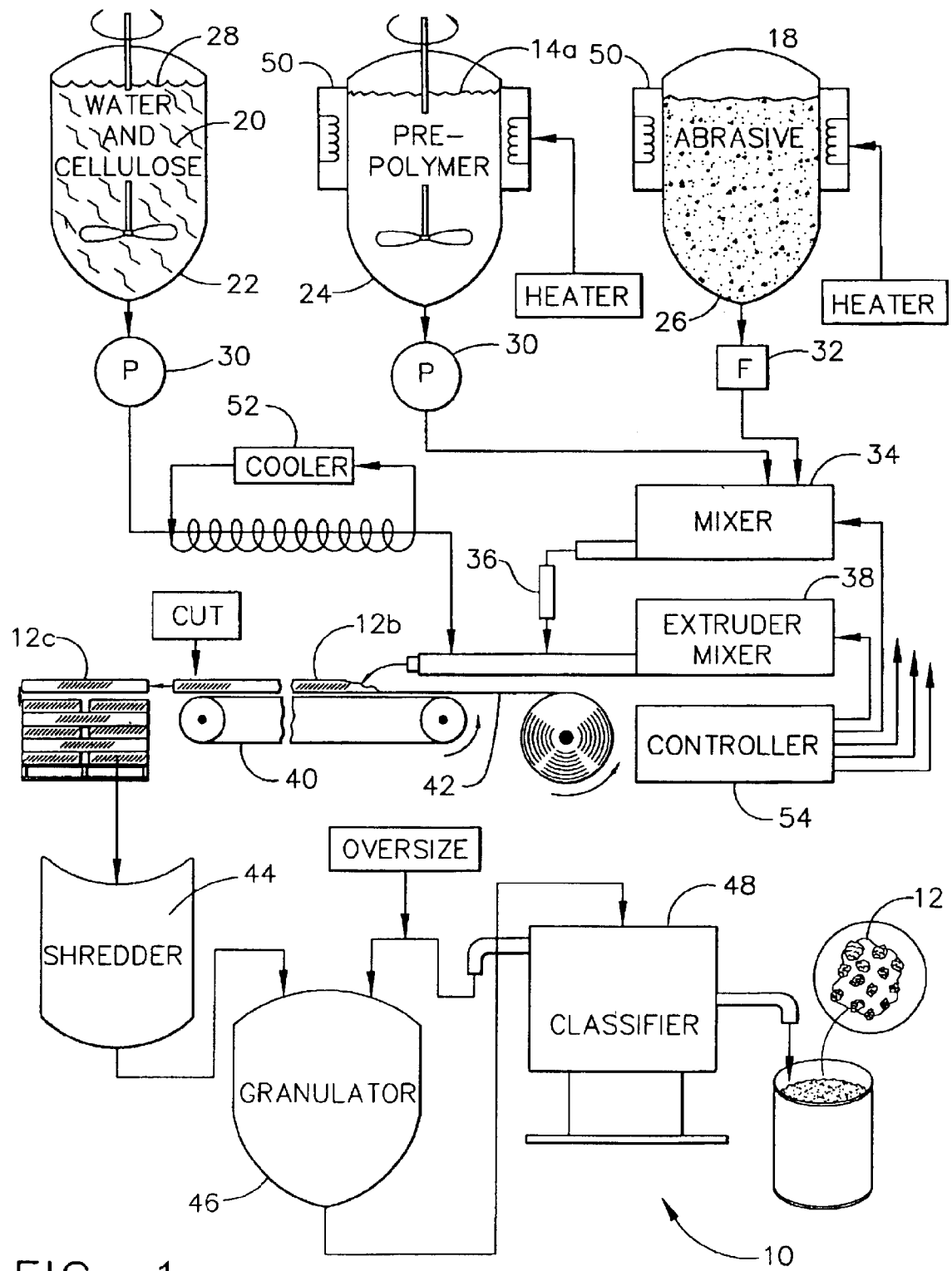
FIG. 1 is a schematic representation of a system for making fiber imbedded polymeric sponge in accordance with an exemplary embodiment of the present invention.
Figure 2:
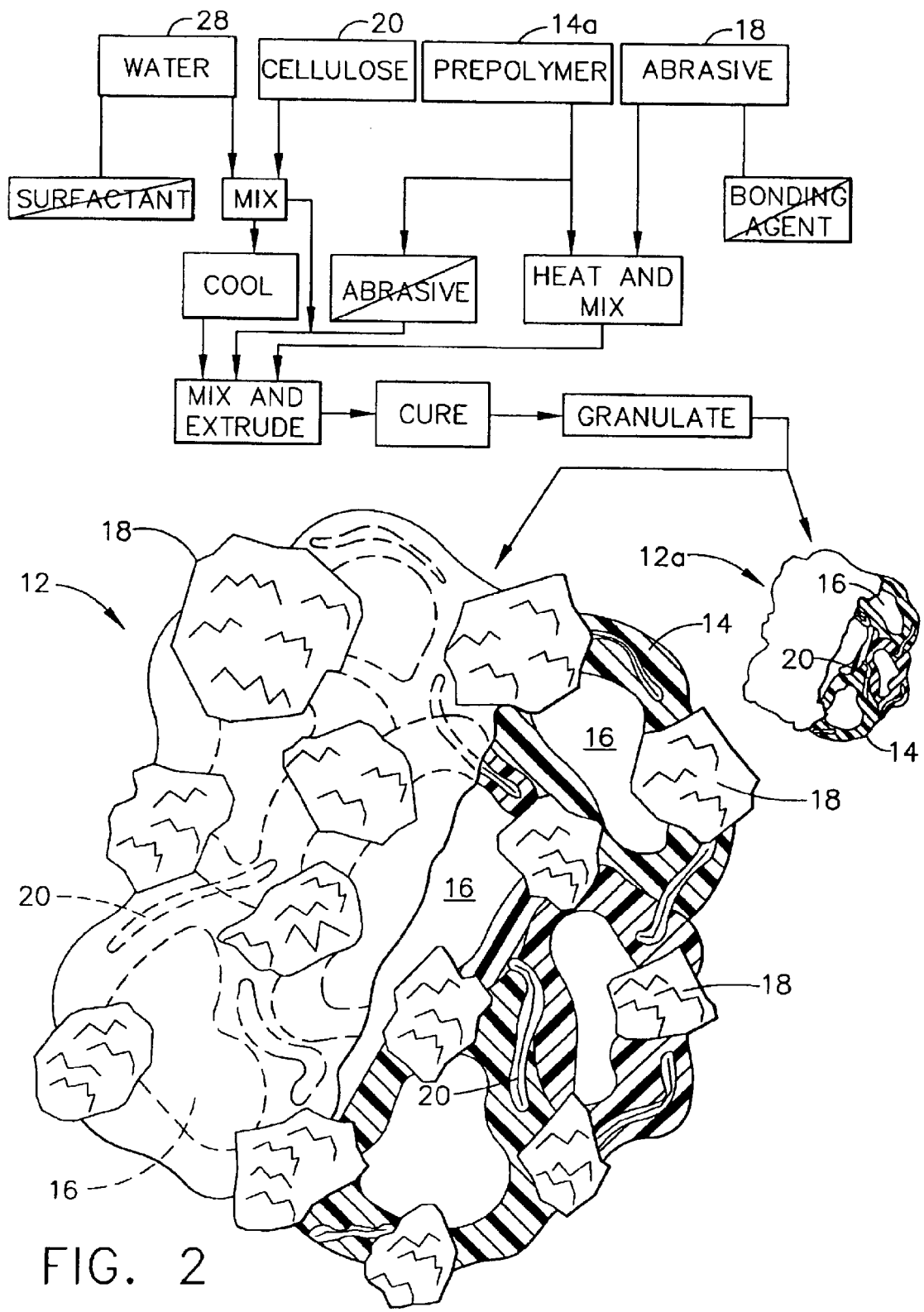
FIG. 2 is a flowchart representation of an exemplary method for making the polymeric sponge, with and without imbedded abrasive particles therein.

Illustrated schematically in FIG. 1 is a system 10 for making granular polymeric sponge 12 in accordance with an exemplary embodiment of the present invention. FIG. 2 illustrates a corresponding flowchart representation of exemplary methods of making the granular sponge 12 using the system illustrated in FIG. 1.

FIG. 2 illustrates greatly enlarged a schematic representation of an exemplary granule of the sponge 12. The sponge defines a cellular foam matrix 14 having a polymer material composition such as polyurethane. The matrix includes minute voids or cells 16 defined by surrounding ligaments of the matrix. The cellular construction and polymeric material composition produce a resilient or pliant sponge which is readily compressible when used as a blasting sponge media in the Sustained Surface Scrubbing processes described above.

In one embodiment, the sponge granules include abrasive particles or other filler materials 18 integrally imbedded in the polymeric matrix 14 for increasing the density or abrasive characteristics of the sponge, or both. Any suitable filler or abrasive material may be used such as inorganic or organic particles of various sizes, various minerals, metal oxides such as aluminum oxide, plastics, glass, steel grit, garnet, copper slage, and black walnut shell for example.

Of particular significance in the polymeric sponge is the inclusion therein of cellulose fibers 20 chemically imbedded and bonded in the polymeric matrix 14 of the sponge. The cellulose fibers substantially improve the strength, durability, and abrasive performance of the sponge granules, as well as improve the manufacturing process of the sponge itself.

As shown in FIG. 1, the system 10 includes three containers or tanks 22, 24, 26 in which the raw ingredients begin the process of manufacture. The first tank 22 includes the cellulose fibers 20 suspended in water 28. A motor driven paddle is used in the first tank to keep the cellulose evenly suspended in the water under rapid agitation.

In their raw state, the cellulose fibers 20 are hydrophilic and may absorb several times more than their own weight in water. The cellulose is therefore preferably premixed with the water in the first tank for permitting absorption of the water therein, and the fibers are substantially uniformly suspended in the water.

The second tank 24 includes the desired prepolymer 14a. And the third tank 26 includes the desired abrasive particles 18, if any, of conventional configuration and composition.

The water and cellulose premix is pumped from the first tank using a progressive cavity positive displacement pump (P) 30 and corresponding conduit. The prepolymer is pumped from the second tank 24 using another progressive cavity positive displacement pump 30. And the abrasive particles are carried from the third tank 26 by any suitable feeder (F) 32 typically in the form of a common conveyer belt or auger feed system.

In accordance with a preferred embodiment of the present invention, the abrasive particles 18 are mixed with the prepolymer 14a, water 28, and fibers 20 for chemical reaction thereof in a preferred sequence. In particular, the abrasive particles 18 are premixed with the prepolymer 14a in a suitable mixer 34, such as an Acrison mixer manufactured by Acrison Inc., Moonachie, N.J. In this way, the abrasive particles and prepolymer may be thoroughly mixed together in a homogeneous mixture prior to mixing with the premixed water and cellulose fibers. The prepolymer abrasive premix may then be accurately discharged and metered from the mixer 34 for subsequent mixing with the water cellulose premix.

Upon exiting the metering auger of the mixer 34, the prepolymer abrasive premix is driven by a powered transfer auger 36 to an extruder mixer 38 of conventional form. The extruder mixer 38 includes an extruder auger which drives the prepolymer abrasive premix to a last section thereof in which catalyst mixing pins are located. The first tank 22 is disposed in fluid communication through the corresponding pump 30 with the catalyst mixing pins inside the extruder mixer for injecting therein the water and cellulose premix.

The preferred prepolymer 14a is a water-catalyzing polyurethane prepolymer compound which undergoes exothermic chemical reaction upon mixing with the water catalyzer. The prepolymer 14a may be catalyzed by the water alone or in combination with amine catalysts.

The water cellulose premix is then mixed in the last section of the extruder mixer with the prepolymer abrasive premix for beginning the chemical reaction thereof which creates the resulting expanding sponge or foam therefrom.

Since the chemical reaction occurs quickly, the mixed prepolymer, abrasive particles, water, and cellulose fibers are extruded from the discharge nozzle of the extruder mixer into an elongate bun 12b carried atop a moving conveyer belt 40 as the chemical reaction progresses. The conveyer belt has a suitable length to permit partial curing of the bun as it expands under the exothermic chemical reaction in which carbon dioxide gas is generated and forms the cellular configuration thereof.

Since the discharged bun is initially adhesive or tacky, a polyethylene plastic sheet 42 is suitably dispensed from a supply roll to provide a barrier between the bun and the conveyer belt to prevent sticking of the bun to the belt. At the end of the conveyer belt, the bun and underlying plastic sheet are suitably cut into shorter bun slabs 12c which are then stored atop a common pallet for final curing. A suitable number of the slabs are stacked on the pallet and then closed in conventional plastic shrink wrap for providing a substantially hermetically sealed enclosure for controlling final curing of the individual slabs.

Any time after final curing of the sponge slabs 12c, the slabs may be further processed and sized as required for the intended use thereof. For example, the slabs are shredded by a conventional shredder machine 44 into smaller pieces of about 4×8×10 cm. The smaller pieces may then be transported by another conveyer belt into a conventional granulator 46 in which the shredded pieces are granulated into smaller particles or granules. The resulting granules are then carried by another conveyer belt to a conventional classifier 48 in which the granules are classified according to size for obtaining substantially uniform-size resulting sponge granules 12. The classifier removes oversized granules and returns them to the granulator for further reduction in size, and also removes undersized granules which may be separately used. The properly classified sponge granules may then be stored in drums, bags, boxes or other suitable containers for shipment.

The basic process of producing polyurethane cellular sponge material including abrasives is well known. A suitable water-catalyzing prepolymer is mixed with the abrasive particles and water and undergoes an exothermic chemical reaction in which carbon dioxide gas is liberated and the mixture expands in volume. Upon final curing of the reacted components, the sponge material is suitably granulated into the desired size.

However, the properties of the resulting sponge granules can vary significantly based on the initial type of prepolymer and ratio of constituent components of the sponge, as well as by the particular details of the mixing process.

As indicated above, commercially available open-cell polyurethane sponge material, with and without imbedded abrasives therein, has limited strength, durability, and abrasive performance when used. The conventional sponge material is subject to rapid breakdown and dusting and typically includes additional chemical constituents for enhancing the performance thereof.

For example, a bonding or coupling agent such as Silane is typically used to precoat the abrasive particles for improving their subsequent bond in the polyurethane sponge. Since the water is the main catalyst for the polyurethane prepolymer, a suitable surfactant is typically used for improving the wetting performance of the water to improve the chemical reaction process. And, additional chemical ingredients may be introduced in the reacting mixture for various performance enhancements, but then limit the manner in which the used sponge material may be discarded in accordance with environmental safety regulations.

In contrast with this conventional process, FIG. 2 illustrates in flowchart form a preferred method of forming the resulting sponge granules 12 corresponding with the improved apparatus or system 10 illustrated in FIG. 1. The prepolymer 14a is preferably a polyether toluene disocyanate polyurethane which may be catalyzed by either water alone or combination with an amine catalyst. This form of prepolymer permits the chemical reaction foaming process to develop primarily only closed cells 16 in the sponge granules as illustrated in FIG. 2.

Since the prepolymer is water catalyzed in the chemical reaction, the water catalyst is a critical ingredient in the mixture and its relative percentage by weight is accurately controlled.

However, it is practically impossible to control the chemical reaction as the water and prepolymer are mixed since the chemical reaction occurs immediately upon mixing and is self-sustaining. The initially free water is rapidly consumed by the chemical reaction during the foaming and expanding process.

However, another significant ingredient in the polymeric sponge and its process of manufacture is the introduction of the cellulose fibers 20. The cellulose fibers in their initial state are hydrophilic with a strong affinity to water and are capable of absorbing many times their own weight in water.

Accordingly, when the premix of water and cellulose is mixed with the prepolymer to initiate the chemical reaction thereof, the free water is immediately used up in either chemically cross linking molecularly with the prepolymer or through out-gassing and evaporation due to the increased heat of exothermal reaction. The water laden cellulose fibers compensate for the rapid loss of free water by releasing their water more slowly during the chemical reaction.

In this way, the chemical reaction is more evenly provided with the catalyzing water as it is released from the cellulose for improving the quality of the resulting polymeric foam sponge material.

Accordingly, the process initially starts with premixing the water and cellulose fibers to permit the fibers to absorb water and be suspended substantially uniformly in the remaining water. The water cellulose premix is then mixed with the prepolymer in the extruder mixer, with the absorbed water in the cellulose fibers then being released more slowly in the chemical reaction with the prepolymer.

During the mixing process in the extruder mixer, the cellulose fibers are uniformly dispersed in the prepolymer and slowly release their water during the chemical reaction. As the chemical reaction is completed and the resulting polymeric bun cures, the cellulose fibers become chemically bonded within the cellular walls of the resulting foam for substantially increasing the strength and durability characteristics thereof.

FIG. 2 illustrates schematically an exemplary sponge granule 12 in which the cellulose fibers 20 are dispersed in the resulting cured polymer within the ligaments of the matrix thereof and between adjacent ones of the abrasive particles 18. The cellulose fibers are therefore encapsulated within the polymer matrix of the sponge granule and form an integral constituent thereof improving its performance. The individual cells 16 within the resulting sponge granule 12 are closed by the polymeric matrix. And, the encapsulated cellulose fibers are no longer hydrophilic in the resulting closed-cell sponge granule, which granule itself is neither hydrophilic nor configured for entraining foreign material or contaminants when used.

The use of the cellulose fibers enjoys many advantages in the production of and in the resultant sponge granules. For example, in view of the affinity to water of the cellulose fibers, conventional surfactants are no longer necessary nor desired. Accordingly, the process illustrated in FIG. 2 is characterized by the absence or exclusion of the use of surfactant therein as designated by the flowchart box with the diagonal line drawn across the surfactant. In this way, the surfactant chemical ingredient may be eliminated from the process for reducing the number of chemical components of the resulting sponge granule.

Furthermore, chemical bonding agent, such as Silane, is another conventionally used chemical ingredient which may also be eliminated or excluded from the abrasive particles in the preferred embodiment as also illustrated by the flowchart box with the diagonal line drawn across the bonding agent. Since the abrasive particles may have various material compositions, their introduction into the sponge granules affects not only the desired performance of those granules but the strength and durability thereof. Conventional bonding agents are used to ensure an effective bond between the abrasive particles and the polymer. Nevertheless, conventional sponge granules have limited strength and durability and are subject to rapid breakdown and disintegration of the bonds between the polymer and the abrasives.

In order to strongly bond the abrasive particles 18 in the resulting matrix polymer 14 of the sponge granules, the prepolymer 14a and abrasive particles 18 illustrated in FIG. 1 are preferably heated prior to mixing with the water 28 and fibers 20.

Preferably the prepolymer and particles are separately heated prior to mixing thereof. This may be effected by providing corresponding electrical heaters 50 around each of the second and third tanks 24, 26 for separately heating the contents thereof. Since the prepolymer 14a is a viscous fluid, the second tank 24 preferably includes a powered paddle which permits slow agitation of the prepolymer to avoid hot spots therein that could degrade and lower the NCO count (or percent of isocyanate) in the prepolymer. Furthermore, the prepolymer is sufficiently heated to thin its viscosity for completely coating the individual grains or particles of abrasive 18 of the desired size thereof when mixed in the mixer 34.

The prepolymer 14a and the abrasive particles 18 are preferably preheated to about the same temperature so that they undergo efficient mixing in the mixer 34 at substantially the same temperature. In this way, the abrasive particles may be completely coated with the prepolymer at the same temperature thereof. This has at least two benefits. Firstly, the abrasive particles do not prematurely cool the prepolymer during contact therewith for maintaining the low viscosity thereof and ensuring maximum coating or wetting of the individual abrasives particles. Secondly, condensation of water vapor on the abrasive particles is avoided and prevents premature initiation of the chemical reaction at the individual abrasive particles which would otherwise occur due to water condensation. In this way, the relatively fluid heated prepolymer completely coats the individual abrasive particles and forms an enhanced bond therewith upon final curing. This increases the retention capability of the particles in the resulting polymeric matrix.

The extruder mixer 38 illustrated schematically in FIG. 1 is a conventional apparatus specifically configured for the mixing and extrusion of various polymeric foaming materials. The prepolymer and water catalyst are separately introduced into the mixer auger for rapid mixing thereof and immediate initiation of the chemical reaction process. This mixing process occurs in the matter of a few seconds prior to discharge or extrusion of the catalyzing mixture from the discharge nozzle of the mixer.

In the preferred embodiment illustrated in FIG. 1, the water cellulose premix is preferably cooled prior to mixing with the prepolymer and abrasive particle premix in the extruder mixer 38. Cooling may be effected in any suitable manner such as by introducing refrigeration equipment or cooler 52 in any suitable form around the supply conduit from the first tank to the extruder mixer. The temperature of the water cellulose premix may then be suitably reduced to sufficiently delay progression of the chemical reaction inside the extruder mixer for maximizing the dispersion of the water cellulose premix throughout the prepolymer and abrasive premix prior to discharge from the mixer nozzle. Delaying the chemical reaction by precooling the water cellulose premix ensures more homogeneity of the resulting mixture and prevents premature chemical reaction which would affect the final performance of the sponge granules, and which could also lead to undesirable clogging of the extruder discharge nozzle.

Since the chemical reaction is exothermic, the effect of the precooled water is short term and is overcome in a matter of a few seconds as the extrudate is deposited upon the moving conveyer belt in the form of the expanding bun 12b.

As indicated above, a preferred prepolymer is polyether toluene disocyanate polyurethane formulated for a water blown closed cell sponge foam end product. One example of this prepolymer is MILLOXANE (TM) PMS 1065 manufactured by PSC Inc. of Lyndhurst, N.J. Other types of this prepolymer could also be used in alternate embodiments.

A preferred form of the cellulose fiber 20 is commercially available from the Cellulose Filler Factory Corp. of Chestertown, Md., under the product designation TC 202. The cellulose fibers in this product range in size from 32 to 200 microns.

Development testing of the process has uncovered preferred process parameters for producing the resultant sponge granules 12 with increased strength and enhanced durability substantially greater than that provided by other commercially available sponge media.

In particular, the sponge media in accordance with a preferred embodiment of the present invention has a composition by weight of about 79% abrasive particles, about 18% prepolymer, about 2% catalyzing-water, and about 1% cellulose fiber. These four ingredients alone may be used to form the resulting sponge granules, although in alternate embodiments additional ingredients as desired may also be introduced into the formulation. As indicated above, various forms of abrasive particles may be used, with aluminum oxide being one common form used in the preferred formulation.

As also indicated above, the cellulose fibers are a significant ingredient in the formulation and improve both the process of manufacture as well as the properties of the resulting sponge granules. In view of the strong affinity for water in these cellulose fibers, the catalyzing-water and cellulose fiber are preferably used in a weight ratio of about 2:1 which is two parts by weight of water to one part by weight of cellulose.

Another significant advantage of using the cellulose having its affinity to water, is that the overall amount of water for the chemical reaction may be minimized for improving the material properties of the resulting sponge. Excess water can adversely affect sponge material properties, and conventional amount of water in polyurethane foam production typically exceeds 2% by weight of the formulation and is primarily dependent upon the percentage by weight of abrasive particles contained in the formulation.

However, by introducing the cellulose fibers into the formulation a significant reduction in the amount of water required is effected, with the water constituent preferably being less than about 2% by weight of the formulation. The ability of the cellulose to slowly release its water during the chemical reaction improves that chemical reaction without the need for providing large excess of water to ensure complete reaction.

Also in the preferred embodiment, the prepolymer 14a and the abrasive particles 18 are heated to about 100 degrees (F.) within a variation of about plus or minus 5 degrees (F.) so that the viscous prepolymer is sufficiently thinned or liquid for readily coating the individual particles of abrasive.

Correspondingly, the water and cellulose fibers are precooled to about 55 degrees (F.) within a range of about plus or minus 5 degrees (F.) prior to mixing with the preheated prepolymer and abrasive particles. These preferred preheating ranges for the prepolymer and abrasive premix and the precooling ranges for the water and cellulose premix may be used for various flowrates of the premixes resulting in a combined flowrate from the extruder mixer ranging from about 25 pounds per minute to about 100 pounds per minute.

The conveyer belt 40 illustrated in FIG. 1 has a suitable length, about 9 meters for example, between its opposite ends for permitting the catalyzing bun 12b to initially cure sufficiently for eliminating the initial tackiness or adhesiveness thereof. The bun may then be conveniently cut into the corresponding slabs 12c and placed on the pallet for final curing over a sufficient time of about three days for example as a minimum and at a minimum temperature of about 60 degrees (F.).

Since the prepolymer is water catalyzed to produce the final sponge granules, the water catalyst is a critical component thereof and affects the chemical reaction process and the resulting polymeric sponge produced. The introduction of the cellulose fibers described above improves the ability to control the chemical reaction and the resulting properties of the polymeric sponge.

The exemplary temperatures disclosed above are also controlled in the preferred process. And, the percentage composition by weight of the ingredients of the formulation undergoing chemical reaction also affects that chemical reaction and resulting polymeric sponge.

Accordingly, the percentage composition by weight of the mixture ingredients may be varied along with variations in the preheating temperatures and precooling temperatures to control the chemical reaction and resulting polymeric sponge properties, as well as for accommodating variations in ambient or room temperature around the processing equipment, and variations in ambient humidity levels.

Process control may be conveniently effected by using a central computerized controller 54 as shown in FIG. 1. The controller has an operator control panel and is operatively joined to the various pumps, augers, and mixing controls of the system components, each with its own variable speed control. Flow rates, temperatures, and mixing durations are all adjustable depending on the desired formulation requirements.

The introduction of the cellulose fibers provides an additional ingredient having particular synergy with the water ingredient for its affinity therefor, as well as providing a synergistic constituent in the matrix ligaments of the final polymeric sponge improving its strength and durability, and resulting performance when used in the process of Sustained Surface Scrubbing described above.

FIG. 2 illustrates in flowchart form process steps including the introduction of the cellulose 20 with the water 28 in a premix which is cooled prior to mixing with the preheated premix of prepolymer 14a and abrasive particles 18. The mixture is then cured and granulated.

The resulting sponge granules 12 have a suitably small size of about several millimeters with closed cells 16 enclosed by the polymeric matrix 14 reinforced by the cellulose fibers 20 encased therein. And, the abrasive particles 18 are integrally bonded in the polymeric matrix 14 and dispersed uniformly throughout the individual sponge granules. The sponge is relatively resilient and pliant and is readily compressible when discharged in a stream of pressurized carrier air for scrubbing against the intended surface for selectively removing material therefrom.

The sponge granules may be reused multiple times due to their enhanced strength and durability without premature disintegration of the polymeric matrix and liberation of the abrasive particles imbedded therein.

However, sponge granules may be manufactured without the abrasive particles or other filler particles for use alone with abrasive performance attributable solely to the polymeric sponge itself.

Accordingly, the use of the abrasive particles may be excluded or eliminated in the manufacturing process and the resulting sponge granules, designated 12a, are illustrated schematically in FIG. 2 adjacent to the abrasive particle form of the sponge 12. In this embodiment, the flowchart includes alternate paths in the manufacturing sequence in which the abrasive is not introduced, or is excluded, as designated by the flowchart box with a diagonal line through the abrasive feature, which bypasses the preheating and mixing step with the abrasive particles. Since the abrasive is not being introduced in the process, preheating of the prepolymer is not required, and the prepolymer may be directly delivered to the extruder mixer without any auxiliary heating of the prepolymer.

However, the advantages of the cellulose fibers 20 may be still enjoyed in this alternate embodiment by premixing those fibers with the water in the same manner described above. However, the water cellulose premix does not require precooling in view of the lower, room temperature of the prepolymer without auxiliary heating thereof, and the water cellulose premix may be directly channeled to the extruder mixer without auxiliary precooling thereof.

The overall process is otherwise the same and enjoys the advantages introduced by the cellulose fibers in enhancing the chemical reaction of the water catalyzed prepolymer, and increasing the strength and durability of the resulting sponge granules 12a without imbedded abrasive or filler particles therein. But for the elimination of the particles, the particle-free sponge 12a is similarly configured to the particulate-laden sponge 12 including the closed cells 16 defined by the surrounding polymeric matrix with imbedded cellulose fibers therein.

Although the polyurethane prepolymer is preferred in the embodiments described above with closed cells and with or without the abrasive particles, other forms of water-catalyzing prepolymers may be used to advantage in the improved process described above. The water entraining capability of the cellulose fibers enhances the chemical reaction with the water-catalyzing prepolymer, and the fibers are chemically bonded therein in the final product. The integrated cellulose fibers improve both the process and the resulting polymeric sponge.

Furthermore, when abrasive and other filler particles are desired in the polymeric sponge, the preferred preheating of the particles and prepolymer for enhancing the process and resulting bonding between the polymer and particles may also be enjoyed.

The improved process described above may be used without the addition of surfactants or chemical bonding or coupling agents for the added particles which therefore decrease the number of chemical ingredients required in the resulting sponge. And, disposal of used sponge media will introduce fewer chemicals into the environment.

The improved sponge blasting media described above enjoys uniformity in configuration and cell size. It has a more consistent finished product shape and density; and more even distribution of abrasive particles within the cellular matrix. The media, allows for a cleaner, less ragged cut edge when ground to size. Better and faster cutting to size within the granules means less undersized waste. And, a narrower range between upper and lower limits for finished product sizing, resulting in an increased measure of control and recyleability for the end user.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A method of making a polymeric sponge including integral cellulose fibers comprising:

mixing water and cellulose fibers;

mixing a water-catalyzing prepolymer with said water and cellulose mixture for chemical reaction thereof;

curing said reacting mixture to form said polymeric sponge including said integral cellulose fibers therein; and granulating said sponge.

2. A method according to claim 1 further comprising premixing said water and cellulose fibers prior to mixing with said prepolymer to suspend said fibers substantially uniformly in said water.

3. A method according to claim 2 wherein said cellulose fibers are hydrophilic and absorb more than their weight in water during said premixing thereof with said water.

4. A method according to claim 3 further comprising releasing said absorbed water from said cellulose fibers in said chemical reaction with said prepolymer.

5. A method according to claim 4 wherein said water, fibers, and prepolymer are mixed without abrasive particles, and without the use of auxiliary heating or cooling thereof during said chemical reaction.

6. A method according to claim 4 further comprising mixing abrasive particles with said prepolymer, water, and fibers for said chemical reaction thereof.

7. A method according to claim 6 wherein said particles are premixed with said prepolymer prior to mixing with said premixed water and fibers.

8. A method according to claim 7 further comprising heating said prepolymer and particles prior to mixing with said water and fibers.

9. A method according to claim 8 further comprising cooling said water and fibers prior to mixing with said prepolymer and particles.

10. A method according to claim 9 wherein said prepolymer and particles are separately heated prior to mixing thereof.

11. A method according to claim 10 wherein said prepolymer and particles are heated to about the same temperature.

12. A method according to claim 11 wherein said prepolymer and particles are heated to about 100 degrees (F.).

13. A method according to claim 12 wherein said water and fibers are premixed in a weight ratio of about 2:1.

14. A method according to claim 13 wherein said water and fibers are cooled to about 55 degrees (F.) prior to mixing with said heated prepolymer and particles.

15. A method according to claim 14 wherein said abrasive particles, prepolymer, water, and cellulose fibers are mixed by weight of about 79%, 18%, 2%, and 1%, respectively.

16. A method according to claim 15 wherein said prepolymer comprises polyether toluene disocyanate polyurethane.

17. A method according to claim 9 wherein said particles are mixed with said prepolymer without a bonding agent.

18. A method according to claim 9 further comprising extruding said mixed prepolymer, particles, water, and cellulose fibers in an elongate bun atop a moving conveyer belt as said chemical reaction progresses.

19. A method according to claim 18 further comprising dispensing a plastic sheet between said bun and belt to prevent sticking of said bun to said belt.

20. A method according to claim 18 further comprising:
   cutting said bun into shorter slabs at the end of said belt; and
   storing said slabs for a plurality of days for final curing thereof.

21. A method according to claim 20 further comprising in turn shredding said slabs into smaller pieces, granulating said pieces into smaller granules, and classifying said granules into substantially uniform size.

\* \* \* \* \*